United States Patent [19]

Bette

[11] 4,076,013
[45] Feb. 28, 1978

[54] SOLAR HEATING SYSTEM

[75] Inventor: Joseph A. Bette, Southbury, Conn.

[73] Assignee: Universal Construction Industries, Inc., Southbury, Conn.

[21] Appl. No.: 666,010

[22] Filed: Mar. 11, 1976

[51] Int. Cl.² ............................ F24J 3/02; E04C 1/00; F24H 7/00
[52] U.S. Cl. .................... 126/270; 126/271; 126/400; 237/1 A; 52/309.1
[58] Field of Search .............. 126/270, 271, 400; 52/309; 237/1 A

[56] References Cited

U.S. PATENT DOCUMENTS

| | | | |
|---|---|---|---|
| 2,559,869 | 7/1951 | Gay | 126/270 X |
| 2,559,870 | 7/1951 | Gay | 126/270 X |
| 2,601,905 | 7/1952 | Anderegg | 126/270 X |
| 3,249,682 | 5/1966 | Laing | 126/270 |
| 3,381,432 | 5/1968 | Brandwein | 52/86 X |
| 3,412,728 | 11/1968 | Thomason | 126/270 |
| 3,894,685 | 7/1975 | Keyes et al. | 126/270 |
| 3,946,721 | 3/1976 | Keyes et al. | 126/270 |
| 3,949,732 | 4/1976 | Reines | 126/270 |

*Primary Examiner*—William F. O'Dea
*Assistant Examiner*—Larry Jones
*Attorney, Agent, or Firm*—John A. Mitchell; Pasquale A. Razzano

[57] ABSTRACT

A solar heating system for a building consists of a stressed-skin roof structure which includes at least one layer formed of longitudinally extended channel-shaped beam members, wherein each beam member is generally U-shaped in cross-section and positioned with its open channel directed outwardly of the building. These beam members are placed side by side with their central bight portions lying in substantially the same plane. The open outwardly facing channels of the beams are closed to form a closed channel or air space which is heated from the sun. A heat storage bed is associated with the building and means are provided for selectively circulating air from the closed channels in the layer of beams to heat the storage bed and to return the air from the storage bed to the closed channel. The heat stored in the storage bed is selectively distributed to the interior of the building through a separate air circulating circuit.

9 Claims, 11 Drawing Figures

SOLAR HEATING SYSTEM

The present invention relates to a solar heating system for a building, and in particular to a solar heating system which is adapted to form a structural part of the building.

A variety of different types of solar heating systems have been previously proposed which utilize heat and radiant energy from the sun in order to store heat in a storage bed or the like for later distribution and use in the interior of the building. Such solar heating systems typically require heat collection panels or structures which are mounted on, or exteriorly of, the building itself. Thus these systems represent a substantial additional expense over and above the cost of the building structure itself.

By the present invention, a building structure is created which incorporates therein a solar energy heat collection system which can form an integral structural part of the building. That is, the present heat collection system can form a wall, or part of a self-supporting structure, or the roof area of a building or the like. It is particularly useful in stressed-skin span structures.

Stressed-skin span structures adapted to support relatively large loads over an open area have been previously proposed, as for example in U.S. Pat. No. 3,381,432 issued to Roland Brandwein, the disclosure of which is incorporated herein by reference. In such structures, upwardly opening channel-shaped beam members are provided in layers, with each beam member in each layer being disposed in side by side contact with adjacent beams and in contact with the undersurface of channel-shaped beams in a layer disposed directly thereabove. The beam members connected in this manner form a stressed-skin structure that is capable of supporting relatively large loads in excess of the load which individual components of the beams could otherwise support. In accordance with the Brandwein structure, the channels in each layer are filled with a light rigid core material for insulating the building and for enhancing the strength of the total structure.

In accordance with the present invention a stressed-skin self-supporting structure or building element similar to the Brandwein span structure is provided which is used to form a solar heating system for the building. In a presently preferred embodiment of the invention the structure is provided with three layers of channel-shaped beams positioned with the channels of each beam facing outwardly, and with the uppermost layer of beams closed along the free ends of its legs by a transparent sheet material or glaze. In this embodiment only the channels of the lower or innermost layer of beams are filled with an insulating material, while the channels in the upper two layers are unfilled. The channels in the second layer are placed in communication, through a blower or the like, with a heat storage bed, e.g. a rock bed, in an air circulating system. By this arrangement radiant heat from the sun is absorbed in the channels of the first outermost layer of beam members which then heats the air in the dead air in that layer of beams; the heat is transmitted by conduction and convection to the air in the intermediate layer of channels. The moving air in these channels (i.e. air moving under the influence of the blower) is passed to the rock bed which absorbs the heat from the air. The air is then returned to the intermediate layer of channels to absorb further heat from the sun. When desired, the heat absorbed in the rock bed can be supplied to the interior of the building, of which the solar heat collection panel forms a structural part, by a separate blower arrangement.

The above, and other objects, features and advantages of this invention will be apparent in the following detailed description of illustrative embodiments thereof, which are to be read in connection with the accompanying drawings, wherein.

Figure 1:
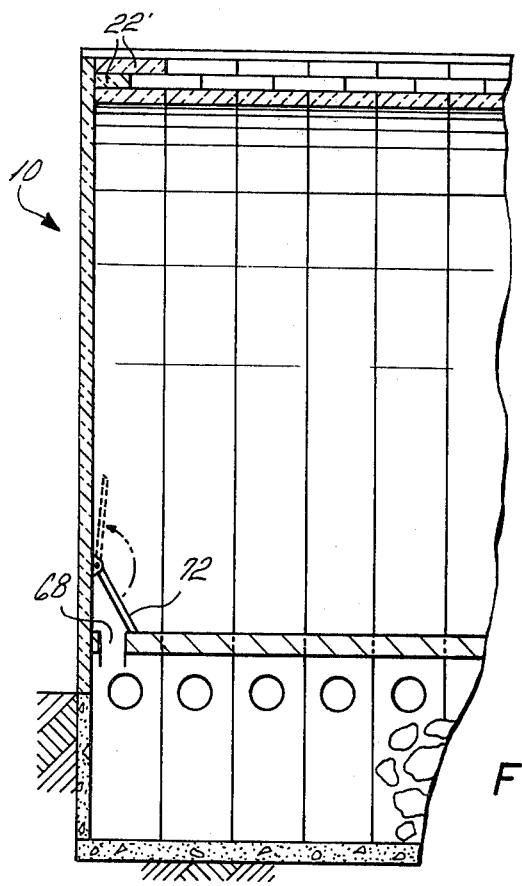
FIG. 1 is a longitudinal sectional view, with parts broken away, of a building structure constructed in accordance with one embodiment of the present invention.
Figure 1:
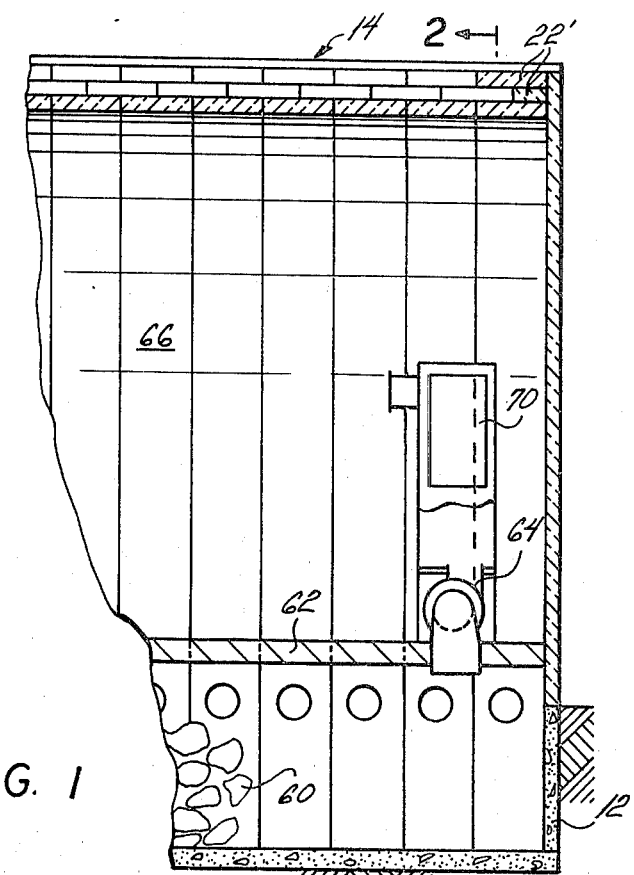
Figure 2:
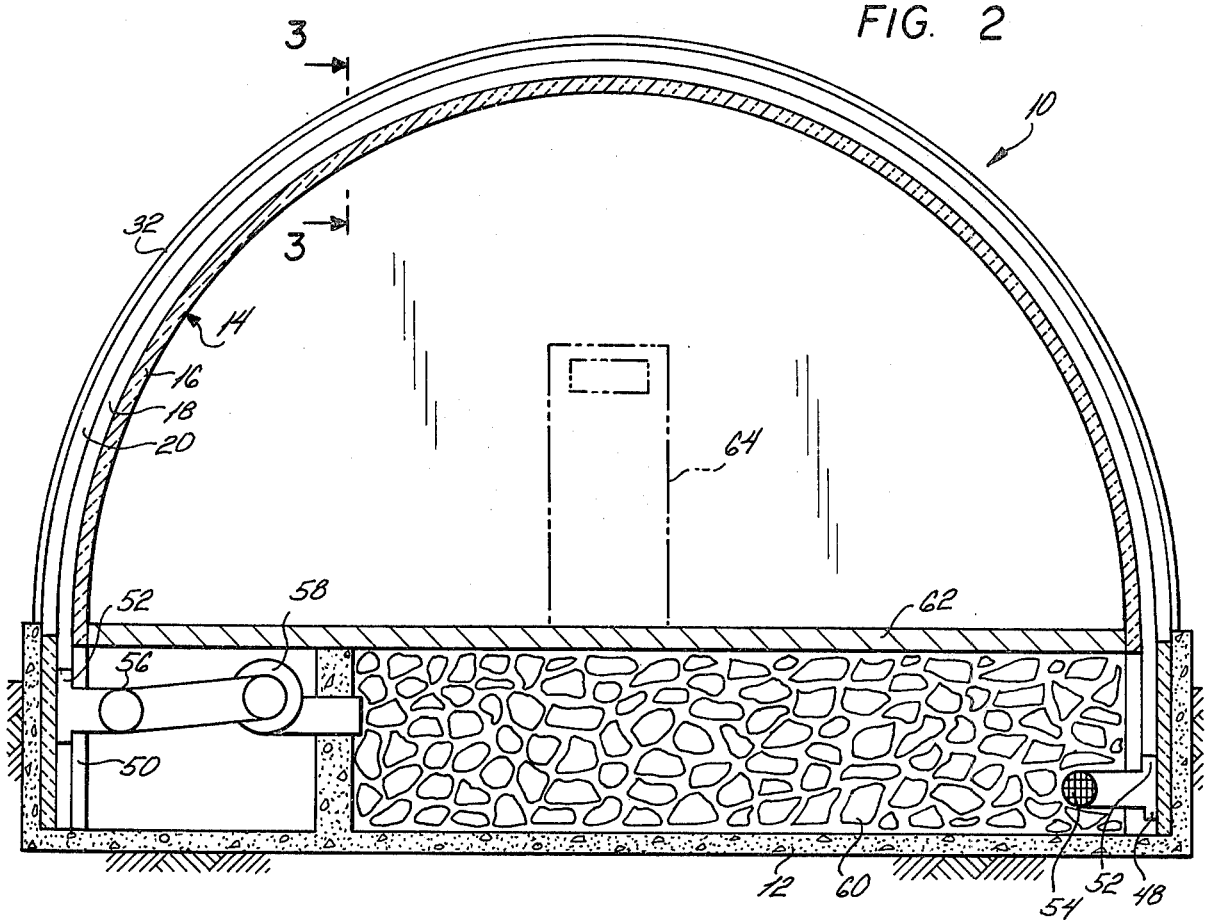
FIG. 2 is a sectional view taken along line 2—2 of FIG. 1.

Referring now to the drawings in detail, and initially to FIGS. 1 and 2 thereof, a building structure 10, constructed in accordance with the present invention, includes a foundation 12 and a stressed-skin self-supporting span structure 14. The span structure 14 consists of three layers (see FIG. 3) 16, 18 and 20 of channel-shaped beam members 22 having a generally U-shaped cross-section. These beam members extend longitudinally from one side of foundation 12 to the opposite side, across a substantial distance. Foundation 12 can take any conventional construction suitable for the size and purpose of the building intended, it being understood that the ends of the beam members are secured into the foundation in any convenient manner.

Channel members 22 are longitudinally extended from one side of the building to the other in a curved arched shaped configuration in order to form, in the illustrative embodiment of the invention, a generally semi-cylindrically shaped building. It will be understood that the degree of curvature in the beam elements can be varied in accordance with the use to which the particular building is placed.

In any case, each of the beam members 22 includes a bight portion 24 and a pair of upstanding side rail or leg portions 26. The upper edges of the side rails 26 may have flange elements 28 extending perpendicularly inwardly therefrom, to permit the beam members to be secured to the adjacent beam members in any convenient manner, as for example by the connecting means disclosed in the Brandwein patent.

Figure 3:
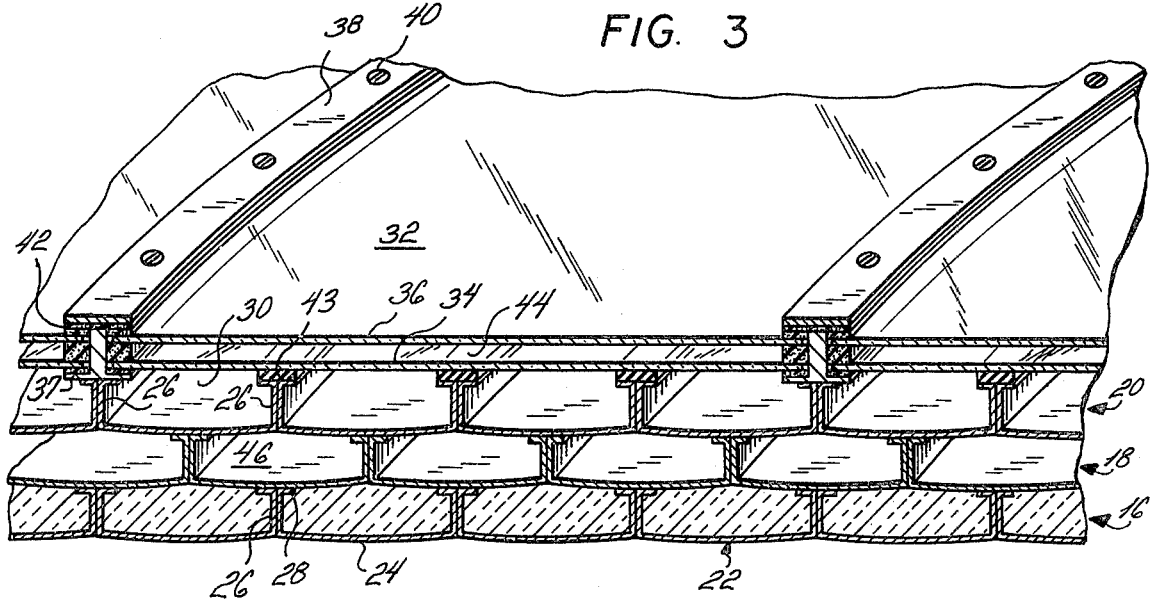
FIG. 3 is a partial perspective view of the stressed-skin structure and solar heat collection panel arrangement of one embodiment of the present invention.

In accordance with the illustrative embodiment of the invention shown in FIGS. 2 and 3, channels 30, defined between the legs 26 of the uppermost layer of beams 20, are closed by a curved transparent glaze or skin 32 of sheet material in a substantially airtight relation. Skin 32 consists of a pair of spaced layers 34, 36 of a transparent material such as glass, fiberglass, or plastic materials sold under the trademarks LEXAN, KALWALL and TEDLAR. These sheets are held in spaced relation to each other and secured to the upper ends of the legs 26 of the channels in the upper layer 20 in any convenient manner, as for example by the clamping arrangement illustrated in FIG. 3. As seen therein an inverted T-shaped element 37 is positioned with its crossbar on the top legs of one pair of channel members 22 and its main leg extending between the edges of two pairs of adjacent sheets 34, 36. A top strip 38 is secured thereto in a clamping arrangement by means of screws, bolts or rivets 40, in any convenient manner. Insulating material 42 can be placed between the surfaces of the members 37, 38 and the sheets 34, 36 in order to form an airtight seal and to accommodate expansion and contraction of the sheet material.

The connecting strips 37 are placed at predetermined spaced positions in accordance with the width of the sheet material. Between the connecting strips the lower sheet 34 is supported on the legs 26 of the channel members 22 by any convenient type of cushioning strip, such as for example a strip of rubber 43 or the like. In this manner a space 44 is defined between the sheets 34, 36, which acts as an insulating air space to prevent heat loss from the channels 30 to the atmosphere. It is noted that in the illustrative embodiment of the invention the entire length of building 10 is covered by the skin 32. However, for very large buildings it is possible that only a portion of the length of the building need be covered with skin 32 and constructed to form a solar heat collection system in order to collect the solar heat necessary to heat the interior of the building.

By this construction, heat and radiant energy from the sun are utilized to heat the air trapped in the channels 30, below skin 32, in the first layer 20 of the stressed-skin construction. Preferably, the outwardly facing surfaces of the beam members 22 in layer 20 are painted or otherwise colored black, in order to increase the efficiency of absorption of solar heat and energy. The heat thus captured in the channels 30 and in the beam members of the layer 20 is transmitted through conduction and convection to the air within the channels 46 in the beam members of the intermediate layer 18. This heated air is used to supply heat to a storage bed as described hereinafter.

The channels of the beams 22 forming the lower layer 16 are filled with an insulating material, such as for example foamed polyurethane, fiberglass or other convenient and efficient insulating materials, in order to prevent heat loss from channels 46 to the interior of the building below the layer 16 of beam members 22.

As seen in FIG. 2, the ends 48 and 50 of the channels of the intermediate layer 18 are closed (and preferably filled with an insulating material), but their bright portions 24 adjacent the ends of the channels have apertures 52 formed therein which communicate with air supply ducts 54, 56 respectively. The duct 56 is connected to a fan or blower 58 which draws air from the channels 46 and supplies the air to a heat storage bed 60. The latter preferably is formed from a bed of heat absorbing rocks, such as for example trap rock, which in the illustrative embodiment of the invention is contained within the foundation 12 below the floor 62 of the building. This rock bed also may be located exteriorly of the building or even within the interior of the building if the building has no basement but, in any case, is preferably contained in an insulated enclosure.

In addition to supplying the air from chambers 46 to the rock storage bed 60, blower 58 will cause the air to be circulated through the air passages formed between the rocks in the rock storage bed. The air then flows into return duct 54 and back to channels 46 of beam layer 18. Thus a continuous closed circuit for the air in ducts 46 is provided which enables the heat absorbed from the sun to be stored in the rock bed. Preferably, in the northern latitudes, building 10 will be oriented in an east-west direction so that one side of the building is always exposed to the sun to obtain direct heat therefrom throughout the day. However, by the construction of this embodiment of the invention, in the lower latitudes, the building may be oriented in a north-south direction so that the entire exterior surface of the building is exposed to the sun to enable the accumulation and storage of heat from the sun throughout the day.

In order to supply heat to the interior of the building, as for example in response to a thermostatic control, a second blower 64 is provided which circulates air from the interior 66 of the building through rock storage bed 60. In this manner cooler air from the interior of the building is drawn through a floor register 68 (see FIG. 1), for example, over rock bed 60 to absorb heat therefrom. The heated air is then expelled by blower 64 into the interior 66 of the building. If desired an auxiliary heating mechanism 70, of conventional construction, such as for example an electric coil heater or a gas heater, can be provided in conjunction with blower 64 to supplement the heat obtained from the rock storage bed. In addition, a damper 72 can be provided to selectively open and close the register 68 in response to the demand for heat.

In this manner, a relatively inexpensively constructed building is provided which incorporates as a structural element thereof a solar heating system by which heat from the sun can be absorbed and stored in a rock bed. In effect, the solar collector arrangement of the system forms the exterior of the building and is a structural part thereof.

It is noted that preferably the ends of all of the channel members 22 in each of the layers 16, 18 and 20 are closed with an insulating material to prevent heat losses from the ends of the channels. Similarly, as seen in FIG. 1, the outermost channel members 22 of each layer at the ends of the building are also filled with an insulating material in order to prevent heat losses from the ends of the layers. This further improves the efficiency of operation of the solar heating system.

Figure 5:
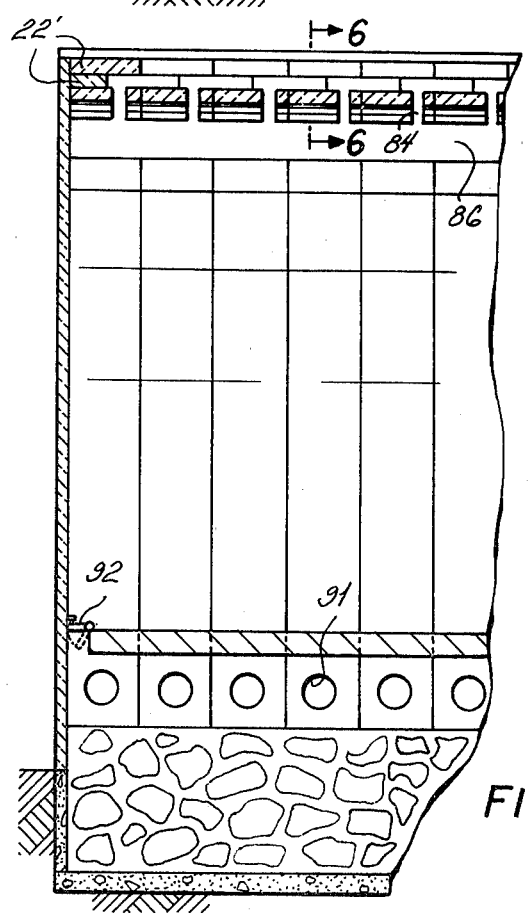
FIG. 5 is a longitudinal sectional view taken along line 5—5 of FIG. 4.
Figure 5:
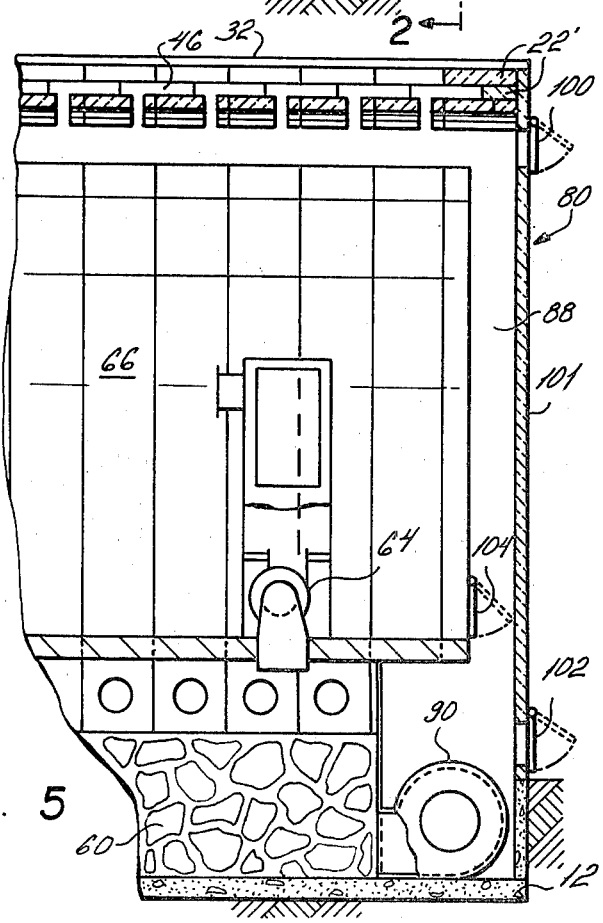
Figure 4:
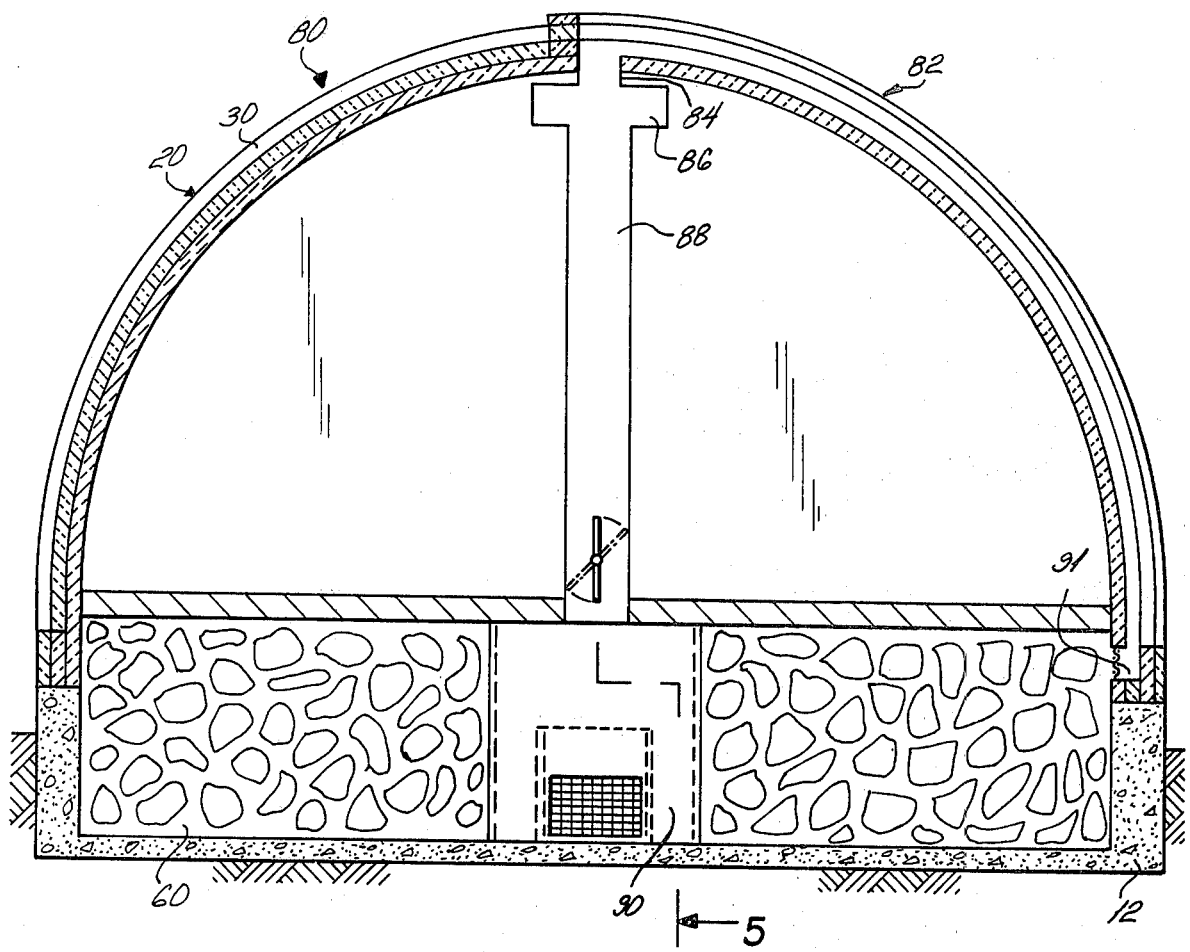
FIG. 4 is a sectional view, similar to FIG. 2, of another embodiment of the present invention.
Figure 6:
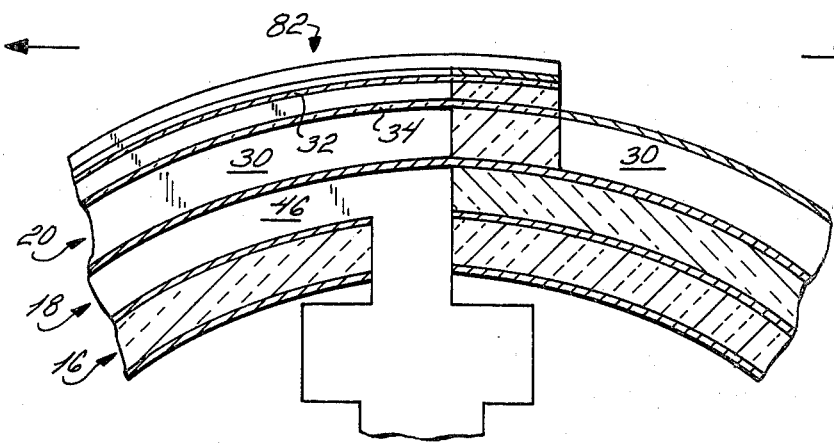
FIG. 6 is an enlarged sectional view taken along line 6—6 of FIG. 5.

In accordance with a presently preferred embodiment of the invention, illustrated in FIGS. 4-6, a building 80 is provided which is constructed from three layers of channel members 22, in a manner similar to that described above with respect to the embodiment of FIG. 1. In this embodiment however only half of the building (the right side in FIG. 4) is covered with a transparent skin surface 82, corresponding to the skin surface 32 described above. In this embodiment of the invention the building is preferably oriented (in the northern latitudes) in an east-west direction so that skin 82 is always exposed to the sun. The remainder of the building (the left side of the building shown in FIG. 4) remains with the channels 30 of upper layer 20 of channels 22 open, since this side of the building faces north and would not normally receive substantial amounts of heat from the sun. In this case the intermediate layer 18 on the north side of the building could also then be filled with insulating material in order to prevent heat losses from the building to the exterior.

With the building construction illustrated in FIG. 4, channels 22 of the intermediate layer 18 (i.e. the portions of these channels on the south side of the building) are open at the top of the building through ports or ducts 84 and connected to a collection duct 86 which runs along the length of the building (see FIG. 5). This duct is connected by a downwardly extending flue 88 to a blower 90, which draws air from the channel 46 through the ducts 84, 86, 88, and supplies it to a rock bed 60 located in the foundation 12 of the building. The air is returned from the rock bed through ports or ducts 91 at the lower ends of each of the channels 22 in layer 18. These ducts extend through the channels 22 of the layer 16, as seen in FIGS. 4 and 5. In this manner an air flow circuit is provided by which air is continuously drawn through the channels 46, ducts 84, 86, 88, to the blower 90, over the rock bed 60 and back into the channels 46.

Blower 90 preferably is operated only upon a demand for heat in the rock bed; this occurs, for example, in response to a thermostatic control whenever the temperature of the air in the channels 46 of the collector system is greater than the temperature of the rock bed. Thus the thermostatic controls are set so that heat is supplied to the rock bed whenever the relative temperatures of the air and bed are such that the bed will absorb heat.

A separate blower 64, similar to that previously described, is provided in order to supply heated air from the rock bed to the interior 66 of the building. In this embodiment of the invention a pressure sensitive damper or flap valve arrangement 92 is provided which is responsive to pressure differences in the interior 66 of the building and rock bed 60. Thus when the pressure in the interior space 66 exceeds the pressure in the rock storage bed 60, flap valve 92 will open to equalize the pressure. When the pressure in storage bed 60 exceeds the pressure in interior space 66, the flap valve will close in order to provide a continuous air flow from the collector to the rock bed.

The heat collector system of the present invention can also be used to heat water for the building's hot water supply system. This can be done by running a water conduit, such as copper tubing, from the water source through the rock bed. The water will then be heated and can be used directly on preheated water supplied to a conventional water heater. In the latter case less energy is required in the water heater to provide hot water at the desired temperature. Hot water can be supplied in this manner during both winter and summer months. In the summer months the thermostatic controls are set to operate blower 90 to supply air to the rock bed only when the temperature of the rock bed falls below a predetermined temperature, e.g. 150° F.

The embodiment of the invention illustrated in FIG. 5 includes an additional feature in that a series of dampers or vents are provided which allow heat to be expelled from the solar heating system to the atmosphere, when it is unnecessary to store heat in the rock bed (or unnecessary to store heat above a predetermined temperature for hot water production in summer), thereby to increase the efficiency of any air conditioning systems provided in the building for use during the summer months. Thus, as illustrated in FIG. 5, a first damper 100 is provided which can be selectively operated in any convenient manner (e.g. manually) to open duct 86 to the atmosphere. Similarly a second damper 102 is provided in the side wall 101 of the building to allow outside air to be drawn into blower 90. Finally a third damper 104 is provided which can selectively close off flue 88. By this arrangement, damper 104 can be operated to close off flue 88, while dampers 100 and 102 are opened. The blower 90 then can be operated to draw outside air into the building over rock bed 60, to cool the rock bed and to force air in channels 46 through the duct 86 and into the atmosphere. As a result, heat absorbed by the solar heat collection panel during the summer months (which heat would otherwise heat air in the channels 46) is expelled from the building, thus reducing the skin or roof temperature of the building and decreasing the need for air conditioning in the building. By the same arrangement, blower 90 can be utilized at night during the summer months to draw cool outside air into the rock bed 60, in order to cool the rock bed to desirable low temperatures. The cooled rock bed can then be used during the daytime in the summer months as a source of cooling in order to cool air from the interior space 66 of the building upon operation of the blower 64 by circulating that interior air over the cooled rock bed.

As with the previously described embodiment, the ends of each of the beam members in each of the layers 16, 18, and 20 are closed with insulation in order to prevent heat losses from the ends of the beam members. Similarly, as seen in FIG. 5, the outermost beam members 221 in each of the layers is also filled with an insulating material to prevent heat loss through the ends of the layers.

Figure 7:
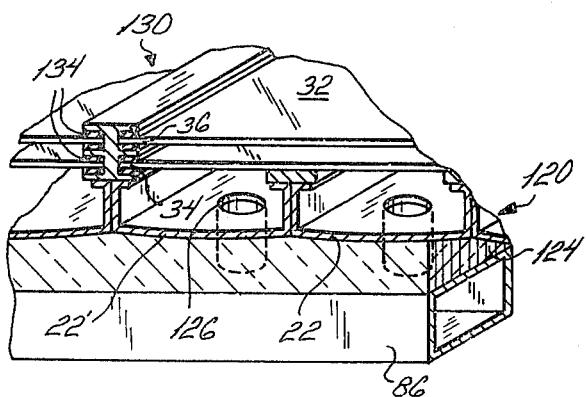
FIGS. 7-10 are partial perspective views, similar to FIG. 3, of additional embodiments of the present invention.

Referring now to FIG. 7 in the drawing, another embodiment of the invention is illustrated wherein a single layer 120 of channel members 22 is provided. This single layer has its open upper end closed by a skin member 32 similar to that previously described so that the channel is heated by the radiant energy of the sun and thus heats the air flowing into the channels 122 of beam layer 120 by both conduction and convection. The underside of these channel members is preferably insulated in any convenient manner as for example by a foamed polyurethane or by fiberglass matting or the like in order to prevent heat losses from the channels 122 to the interior of the building. The channels 122 communicate through ducts 126 with a collector duct 86 similar to that previously described with respect to the embodiment of FIG. 6. That duct is in turn connected to a circulating blower which draws air from channels 122 through ducts 126 into the main duct 86, thence to the blower and over the rock storage bed in the foundation of the building for return to the channels 122 in a manner similar to that described with respect to the embodiment of FIG. 5. However the arrangement is suitable for use, for example, in the construction of relatively small buildings or buildings which are used for storage facilities and in which only relatively low temperatures need be maintained. This arrangement will serve to supply heat for storage in the rock bed but would not be as efficient as the embodiment of the invention previously described.

In FIG. 7 a connector arrangement 130 for skin 32 is provided which is similar to the connector arrangement used for the transparent skin sheets of the embodiment of FIG. 3. However in this form, the connector is a single extruded element 132 having channels 134 formed on opposite sides thereof which receive edges of the sheets 34, 36 of the skin. The channels are filled with a suitable sealing element, such as silicon, which will provide an airtight seal and accommodate expansion and contraction of the sheet elements.

Figure 8:
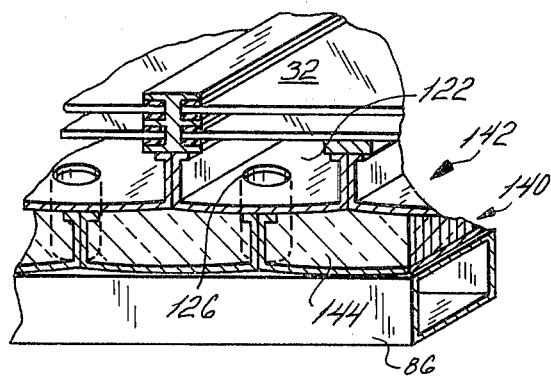

A further embodiment of the invention shown in FIG. 8 is formed with two layers 140, 142 of channel shaped beams 22 in a manner similar to that previously described. In this form the innermost layer 140 is filled with an insulating material 144 and channels 122 of the upper layer 142 are connected through ducts 126 to the collector duct 86. Again, the channels 122 of the upper layer 142 are closed by a transparent skin 32 so that the air in channels 122 is heated. This arrangement is similar to the arrangement of FIG. 7 in that the moving air in the channels 122 is heated by conduction and convection from the beams of layer 142 beneath the skin 32 which absorb radiant energy from the sun through skin 32; but an additional layer of stressed skin channels 22 is provided to add structural strength to the building. As in the prior embodiment of FIG. 7, air in channels 122 is circulated through the channels and duct 86 and a rock storage bed by a blower.

Figure 9:
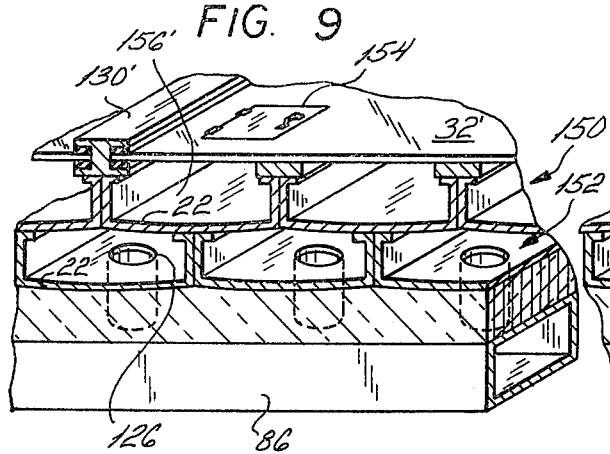

FIG. 9 of the drawing illustrates a further embodiment of the invention where again two layers 150, 152 of channel members 22 are provided. In this form of the invention the upper layer 150 is closed by a skin 32' and the second layer 152 is connected by the ducts 126 to the collector duct 86. In this form the upper layer 150 acts as a heat collector in the same manner as the upper layer of the embodiment of FIGS. 1 and 5, while the second layer 152 has the moving air flow therethrough in the same manner as the intermediate layer of the previously described embodiments of FIGS. 1 and 5. The lower layer 152 is insulated on its lower surface to prevent heat losses to the interior of the building by layers of fiberglass secured thereto in any convenient manner or by a foamed insulation material.

In this form of the invention it is seen that the skin 32' consists of a single sheet of transparent material secured to channels 22 by an appropriately extruded connector strip 130'. It will be appreciated that although a single skin sheet is disclosed in this embodiment of the invention a double spaced sheet such as previously described could be used for the skin instead. It is believed that the double layer skin will be more efficient in that it provides an insulating air space between the layers of skin which will limit heat losses through the skin from the channel therebelow. However the single sheet skin may be sufficient where the building is intended for use as a storage facility or factory, and thus only a minimal heat level must be maintained within the building.

FIG. 9 also illustrates another feature of the invention in that skin 32 can be provided with doors or openings 154 therein which permit the closed channels 156 of the upper layer 152 to be selectively opened to the atmosphere in order to allow outside air to circulate through the channels during the summer months and limit the amount of heat collection in such channels. This feature of the invention can also be supplied to the other embodiments previously described, to also permit outside air flow through the channels, under the effects of convection, in order to limit the heat absorption by the solar heating system during the summer months.

Figure 10:
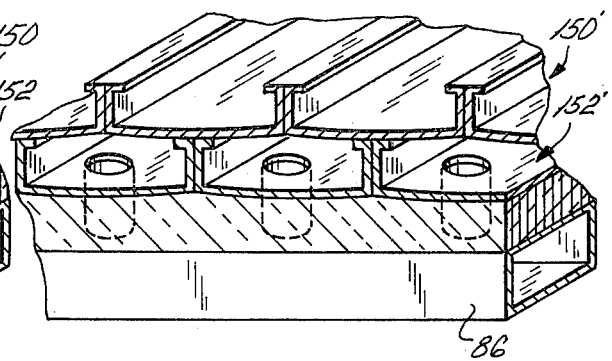

FIG. 10 of the drawing illustrates a further embodiment of the invention, similar to FIG. 9, but without any skin 32' thereon. In this construction of the invention the upper layer 150, which as in the prior embodiments is preferably coated black, collects solar heat and transmits it by conduction and convection to the air flowing in the lower channel 152 under the influence of a blower to a rock heat storage bed, as in the prior embodiments. This system will not be as efficient as the systems using skin 32, since there is no insulating trapped air being heated by solar energy in the channels of the upper layer. However the system may be adequate for storage facilities wherein only low heat levels are required.

Figure 11:
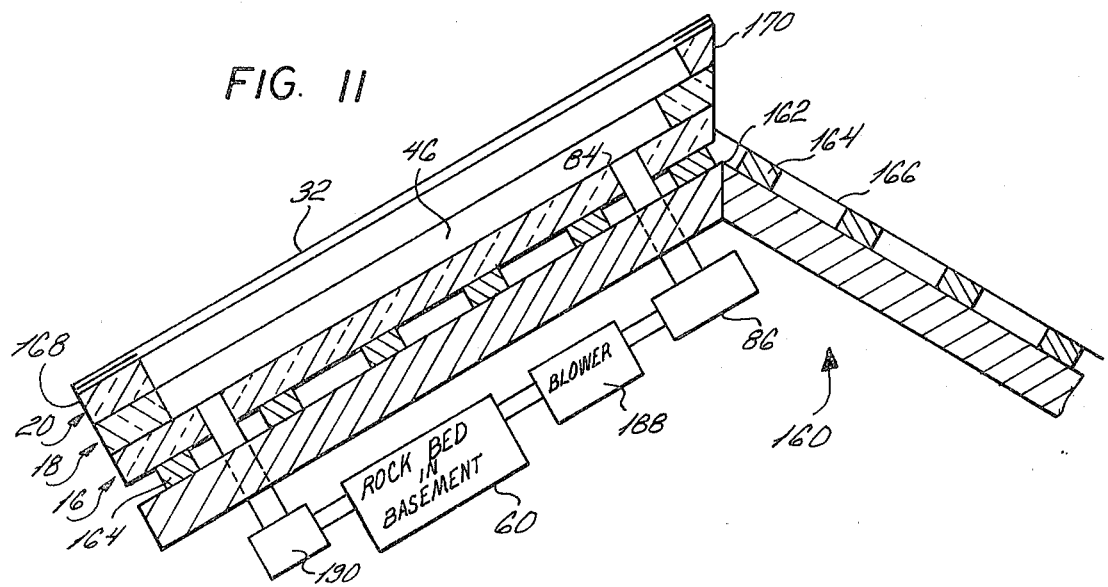
FIG. 11 is a schematic end view of a peaked roof for a house or the like using a solar collection panel constructed in accordance with the present invention.

Finally, in FIG. 11 of the drawing, the solar heating system of the present invention is schematically illustrated to show its adaptation to a conventional building structure, such as a house. As seen therein the peaked roof 160 of a house is formed with angularly related rafters or beams 162 on which transverse purlins are secured in a conventional manner. On the north side of the building a conventional roof 166 is provided, whereas on the south side of the building a solar heating panel 168, constructed in accordance with the present invention, is secured to the purlins 164. In this embodiment of the invention three layers of channel members 22, corresponding to the layers 16, 18 and 20 of the embodiment in the invention illustrated in FIG. 3, are utilized. These channel members however are straight rather than curved, with the beam members of the lower layers 16 being fully insulated and the channels of the beams in the intermediate layer 18 being connected through the ducts 84 to a collector duct 86. The channels in the upper layer 20 are closed by the skin 32 in order to collect heat in the manner previously described. Again the ends of the channels are closed with insulating material, for example foamed insulation 170, in order to prevent heat loss through their ends. The duct 86 is connected through any conventional ducting system to a heat storage rock bed 60, and a blower 188 is provided to circulate the air through the channels 46 in the intermediate layer 18, duct 86, rock bed 60 and return that air through the return duct 190 to the channels 46. Thus, a solar collection panel which forms a structural part of the building 110 can be utilized as a roof element of the building itself. This arrangement as seen in FIG. 11 follows the natural tendency of air heated in channels 46 to rise to the top of the roof peak and withdraw the heated air at the top of the roof. It also allows a pre-existing building to be conveniently and readily modified in an inexpensive manner in order to utilize solar energy to supply heat to the building. Of course, as in the previously described embodiment heat stored in the rock bed is supplied to the interior of the building by a separate blower arrangement (not shown) which can selectively pass interior air over the rock bed.

In accordance with the present invention channels 22 utilized in the stressed skin construction are formed of sheet metal, as described in the Brandwein patent. In addition, these channels, and in particular the exterior channels can also be formed of copper, aluminum, or other metals and materials, in order to improve the heat transfer from the air in the uppermost channels of the skin structure to the channels immediately therebelow in which the moving air is heated.

Although illustrative embodiments of the present invention have been described herein with reference to the accompanying drawings, it is to be understood that the invention is not limited to those precise embodiments, and that various changes and modifications may be effected therein by one skilled in the art without departing from the scope or spirit of this invention.

What is claimed is:

1. A solar heating system for use in a building comprising a self supporting stressed skin roof structure including three layers of longitudinally extended channel shaped beam members wherein each beam member is generally U-shaped in cross-section having a bight portion, outstanding leg portions, and an open channel between said leg portions directed outwardly of the interior of the building; said beam members in each layer being positioned side by side with each other and with their bight portions lying in substantially the same plane; the beam members in the two outermost layers being positioned on the free edges of the leg portions of the beam members in the underlying layer with their bight portions secured to said leg portions therebelow thereby to close the channels of the beam members in the intermediate and lowermost layers; means secured to the free ends of the leg portions of the beam members in the outermost layer for closing the open channels therein in an air tight relation; said means including at least one sheet of a generally transparent material; said channels in said outermost layer having a heat absorbing surface whereby said outermost layer of channels forms a solar heat collector collecting heat from the sun through said transparent material; insulating means in the channels of said lowermost layer for insulating the channels of the intermediate layer against heat loss to the interior of the building; a heat storage bed associated with said building; and means for selectively circulating air through the closed channels of said intermediate layer, through the heat storage bed and back to the channels of the intermediate layer, whereby air flowing in the channels of said intermediate layer below said outermost layer of channels absorbs heat collected from the sun in said outermost layer to in turn heat the heat storage bed to store heat therein; and separate means for selectively circulating air from the interior of said building to said heat storage bed and back to the building to draw heat from the storage bed and supply it to the interior of the building.

2. A system as defined in claim 1 including means for selectively opening the channels of said outermost layer to the atmosphere to reduce heat build up therein in the summer months.

3. A system as defined in claim 1 wherein the exterior surfaces of the beam members in said outermost layer are colored black to efficiently absorb heat from the sun and transmit that heat to the air in the channels of the intermediate layer immediately therebelow.

4. The system as defined in claim 3 wherein said means for closing the open channels of said outermost layer comprises a pair of superimposed sheets of transparent material and means for securing said transparent sheets to said outermost layer of beams in a substantially air tight relation with the transparent sheets spaced slightly from each other to define a closed insulating air space therebetween which limits heat loss from air trapped in the channels of said outermost layer.

5. A system as defined in claim 4 including a blower and an associated duct work system for ducting air flow to and from the channels of said intermediate layer and said rock bed; said ductwork system including means for opening the channels of the intermediate layer to the atmosphere, means for selectively allowing the associated blower to draw air from the atmosphere into the storage bed, and means for selectively preventing air flow from the channels to the blower whereby atmospheric air can be selectively drawn into the storage bed to cool the bed and the closed channels of said intermediate layer and then be discharged from those closed channels to the atmosphere.

6. A system as defined in claim 5 wherein said beam members are curved.

7. A system as defined in claim 5 wherein said beam members are flat.

8. A system as defined in claim 5 wherein the beam members of the ends of each of said layers are filled with an insulating material.

9. A system as defined in claim 8 wherein the ends of said beams in each of said layers are filled with an insulating material.

* * * * *